Oct. 13, 1931.   A. JOSEPH   1,827,019
ANIMAL TRAP
Filed March 21, 1930    3 Sheets-Sheet 2
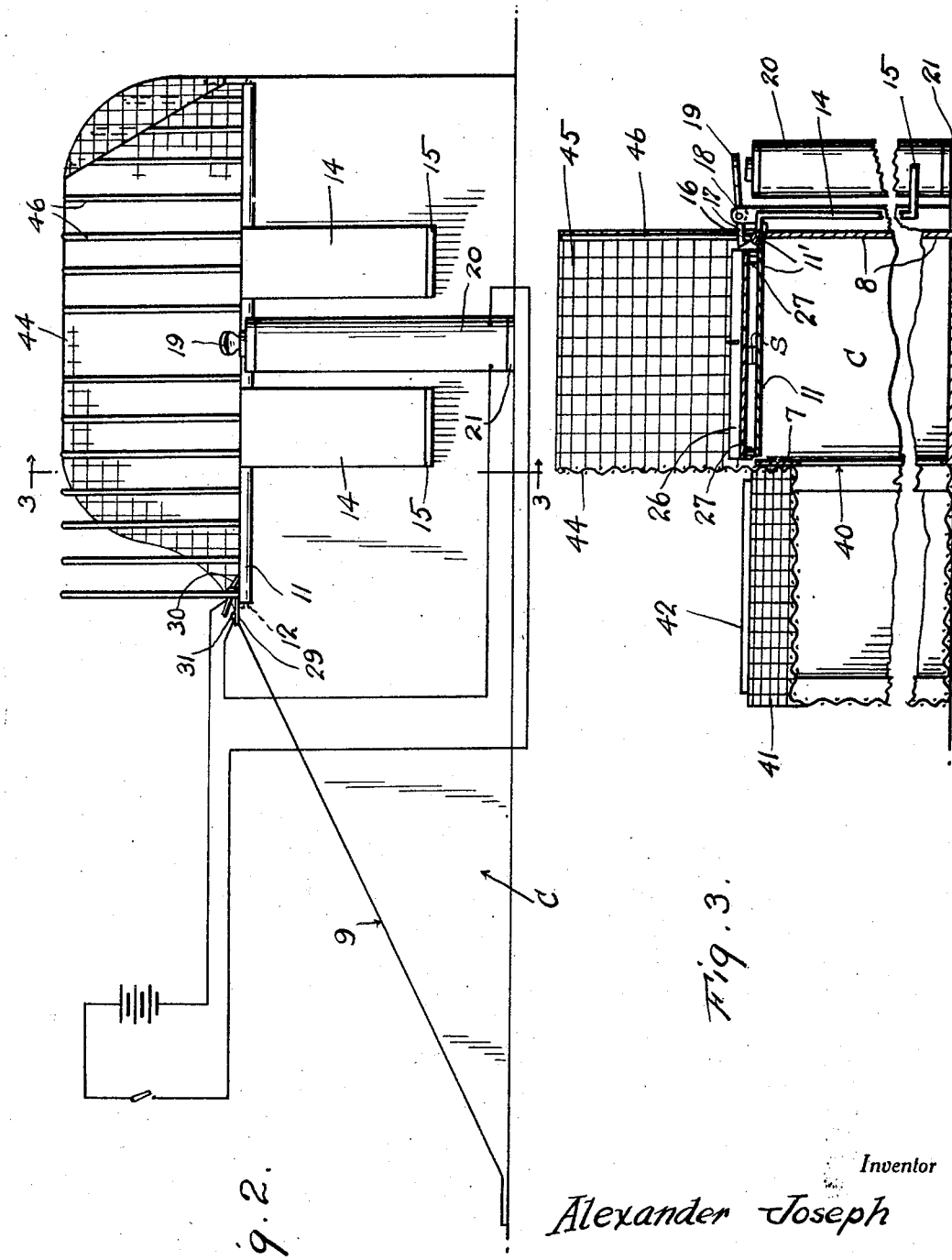
Inventor
Alexander Joseph
By Clarence A. O'Brien
Attorney Oct. 13, 1931.                A. JOSEPH                  1,827,019
                              ANIMAL TRAP
                       Filed March 21, 1930    3 Sheets-Sheet 3
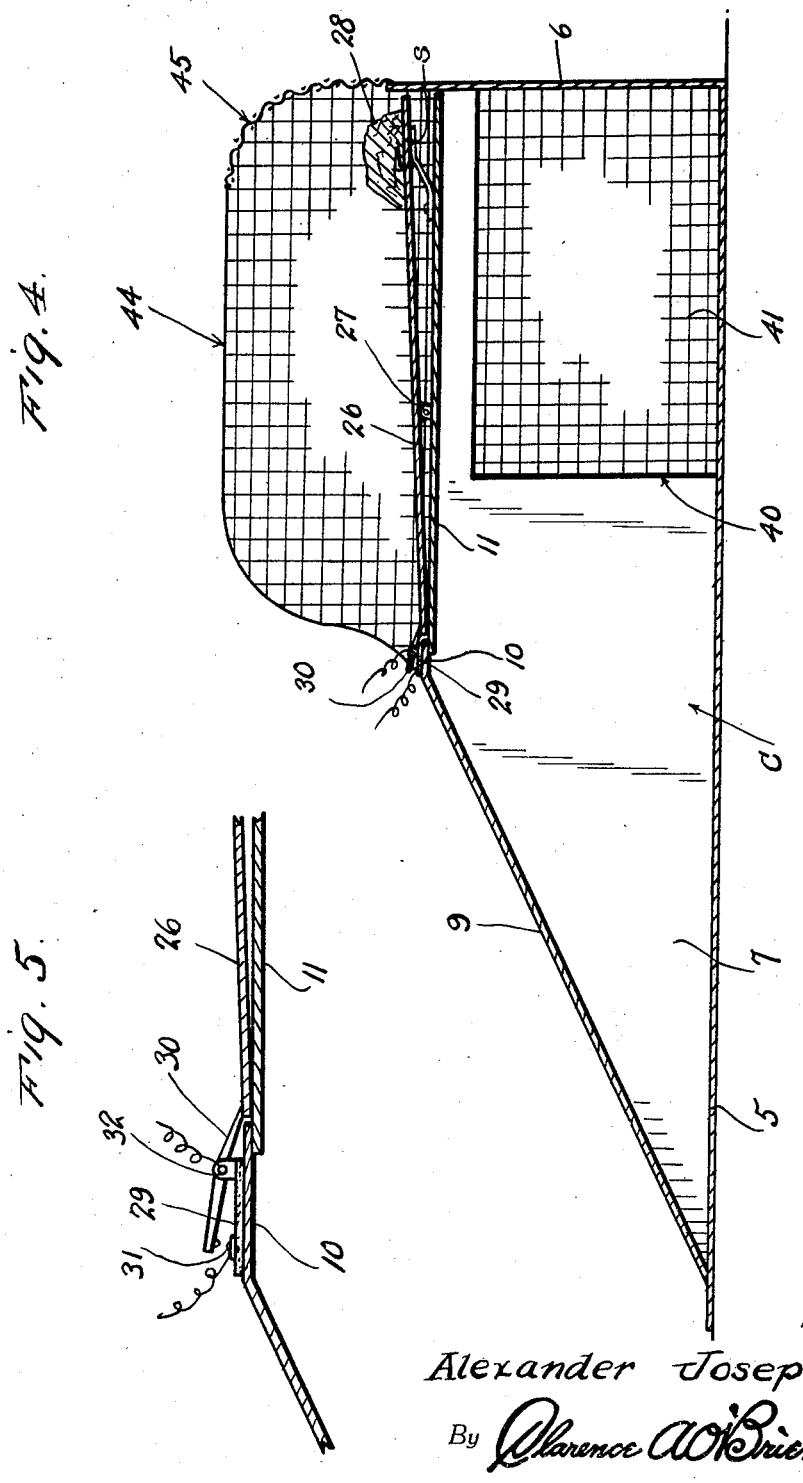
Inventor
Alexander Joseph
By Clarence A. O'Brien
                                                    Attorney Patented Oct. 13, 1931

1,827,019

UNITED STATES PATENT OFFICE

ALEXANDER JOSEPH, OF JACKSONVILLE, FLORIDA, ASSIGNOR TO L. A. JOSEPH, OF JACKSONVILLE, FLORIDA

ANIMAL TRAP

Application filed March 21, 1930. Serial No. 437,810.

The present invention relates to an animal trap particularly adapted for catching rats and the like and the prime object of the invention resides in the provision of an improved trap door having a tilting treadle or platform mounted thereon with circuit closing means actuated thereby for releasing a catch which permits the trap door to swing downwardly to drop the victim into a casing.

Another very important object of the invention resides in the provision of an animal trap of this nature which is simple in its construction, inexpensive to manufacture, thoroughly efficient and reliable in use and operation, and otherwise well adapted to the purpose for which it is designed.

In the drawings:

Figure 2 is a side elevation thereof,

Figure 3 is a vertical transverse section therethrough,

Figure 4 is a vertical longitudinal section therethrough, and

Figure 5 is an enlarged detail section taken substantially on the line 5—5 of Figure 1.

Figure 1:
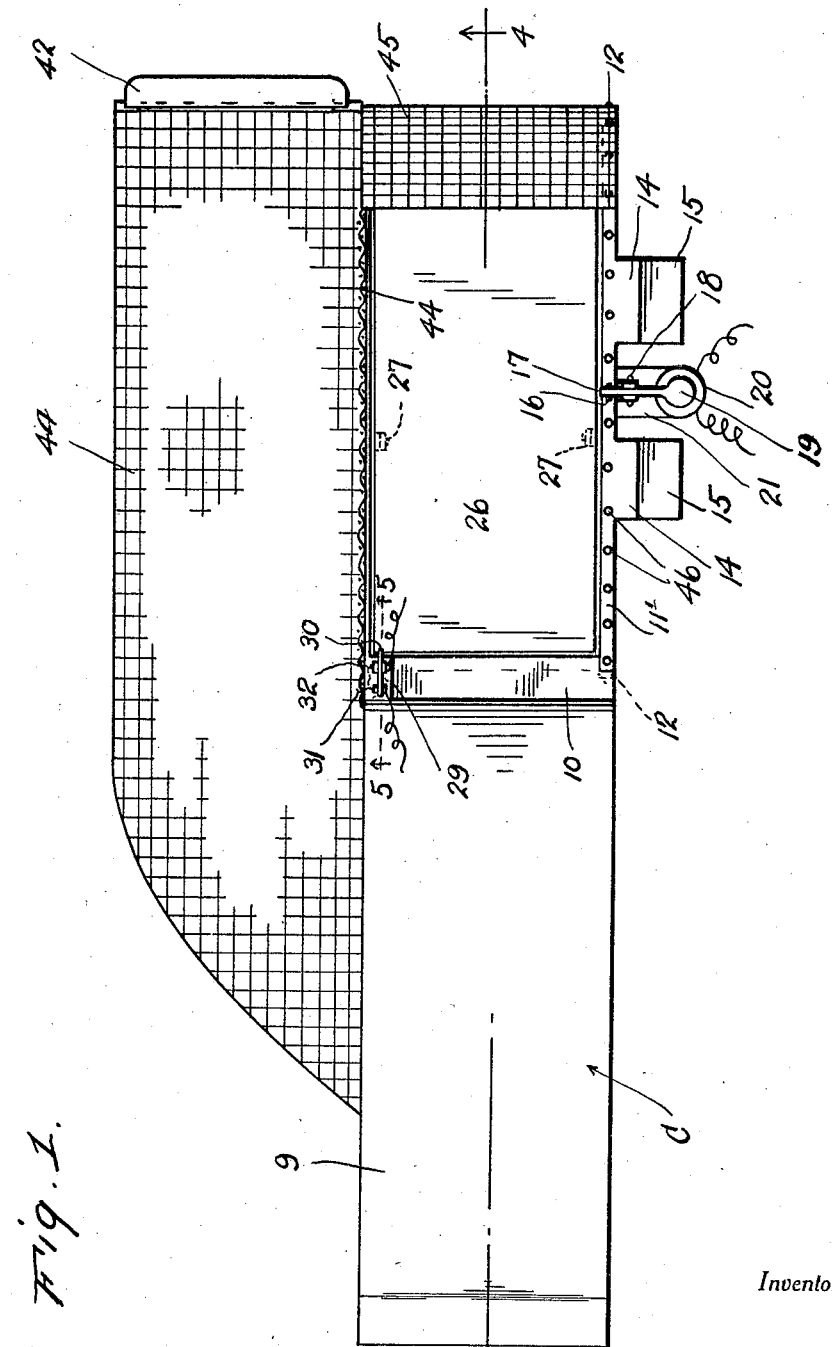
Figure 1 is a top plan view of the trap embodying the features of my invention.

Referring to the drawings in detail it will be seen that the letter C denotes generally a casing which comprises a base 5 with an upstanding rear wall 6, and upstanding side walls 7 and 8. The forward upper edges of the side walls 7 and 8 incline downwardly and forwardly and have mounted thereon a similarly inclined plate 9 merging at its upper end into a horizontal extension 10. A door 11 is hingedly connected to the top of the wall 8 through the medium of a bar 11' which is pivoted at its ends as at 12. Arms 14 extend from the bar 11' outwardly and then downwardly and are weighted as at 15 at their bottom ends so as to normally hold the door in a horizontal position with one portion in abutment with the bottom surface of the extension 10.

A lug 16 rises from the center of the bar 11' and is engaged by a catch 17 pivotally mounted as at 18 and having an end 19 in the form of an armature attractable by an electro-magnet 20 mounted on an extension 21 of the base 5. A platform 26 is rockably mounted intermediate at its ends as at 27 on the door 11 and a spring S is operatively engaged therewith so that the platform will be tilted in the position shown in Figure 4 until the victim walks thereon to the rear end thereof on which will be disposed suitable bait 28.

A circuit closer in the form of a base of insulating material 29 is mounted on the extension 10 and has pivoted thereon an arm 30 one end of which extends over the forward end of the platform 26 and the other end of which is adapted to engage a fixed contact 31 on the base 29.

The pivot support 32 for the arm 30 and the fixed contact 31 are in circuit with the electro-magnet and a suitable source of electrical energy as is clearly illustrated in Figure 2.

Therefore it will be seen that when the victim climbs upon the plate 9 onto the platform to obtain the bait 28, the platform will be tilted so as to swing the arm 30 into engagement with the contact 31 thereby closing the circuit to energize the electro-magnet which will attract the armature end 19 of the catch 17 to release it from the lug 16 and the door will then swing downwardly into the casing causing the victim to fall therein and will return to its normal position through the counterbalancing action of the arms 14 and weighted ends 15 automatically resetting the trap.

The wall 7 has an opening 40 therein adjacent the rear end thereof which leads into the foraminous cage 41 to one side of the casing C which has a door 42 forming the top thereof. A foraminous wall 44 rises from one side of the casing adjacent the cage 41.

A rear wall 45 of foraminous material rises from the rear of the casing and is curved over the door and platform. A plurality of fingers 46 rise from the bar 11 and tend to push the victim down into the casing when the door swings inwardly should the victim attempt to escape.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A trap of the character described comprising a casing open at its top and including a bottom, a vertical end wall and vertical side walls, portions of the upper edges of the side walls being inclined, an inclined wall on the inclined edge portions of the side walls, constituting a runway, said runway terminating in a horizontal extension formed integrally on its upper end, a door hingedly mounted longitudinally on one of the side walls for swinging movement in a vertical plane into the casing, one side portion of the door being engageable with the extension for limiting the swinging movement of the door in an upward direction, a rockable platform pivoted transversely on the door, electrically actuated means for releasably retaining the door in substantially horizontal position, and a circuit closing switch electrically connected with said means mounted on the extension and engageable by the platform for actuation thereby.

In testimony whereof I affix my signature.

ALEXANDER JOSEPH.